(12) United States Patent
Okada

(10) Patent No.: US 6,494,588 B1
(45) Date of Patent: Dec. 17, 2002

(54) SPREAD ILLUMINATING APPARATUS WITH AN OPTICAL PATH CONVERSION MEANS

(75) Inventor: Masafumi Okada, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/606,669

(22) Filed: Jun. 30, 2000

(51) Int. Cl.[7] ................................................. F21V 7/04
(52) U.S. Cl. ............................. 362/31; 362/26; 362/27; 362/330; 362/329; 362/339; 362/511; 362/551; 362/554
(58) Field of Search .......................... 362/31, 554, 583, 362/581, 551, 511, 23, 26, 339, 330, 328, 329, 27

(56) References Cited

U.S. PATENT DOCUMENTS 5,377,084 A * 12/1994 Kojima et al. ................. 362/31
5,442,523 A * 8/1995 Kashima et al. ............... 362/31
6,231,200 B1 * 5/2001 Shinohara et al. ............. 362/26
6,334,691 B1 * 1/2002 Suzuki et al. .................. 362/31

FOREIGN PATENT DOCUMENTS

JP          A-10-182076          7/1998

* cited by examiner

Primary Examiner—Sandra O'Shea
Assistant Examiner—Bertrand Zeade
(74) Attorney, Agent, or Firm—Oliff & Berridge, PLC

(57) ABSTRACT

A spread illuminating apparatus, in which a bar-like light conductive member brightened by a light emitting diode disposed at an end thereof is disposed close to the side of a transparent substrate made of light-permeable materials. The light conductive member is provided with a row of prism grooves as an optical path conversion means and an optical path conversion plate is disposed between the light conductive member and the transparent substrate. Light from the light emitting diode enters the light conductive member and is directed slantingly at the prism grooves to enter the optical path conversion means. Then, the light enters the transparent substrate straight to illuminate it efficiently.

9 Claims, 5 Drawing Sheets

SPREAD ILLUMINATING APPARATUS WITH AN OPTICAL PATH CONVERSION MEANS

BACKGROUND OF THE INVENTION

1. Field of the Invention

This invention relates to a spread illuminating apparatus for a display portion of a personal computer or the like, in particular, for using as an illuminating means of a portable type of liquid crystal display apparatus.

2. Conventional Art

For a display of a personal computer, a cathode ray lamp (so called a picture lamp) has been used primarily. However, since it is large in size, heavy in weight and high in electric power consumption, recently a liquid crystal panel has been heavily used. Further, such panels have been used also for information terminal appliances such as a note book type of personal computer or portable telephone.

As mentioned above a demand for a liquid crystal panel has been rapidly increased, but since the liquid crystal panel itself does not emit light, an illuminating apparatus becomes necessary. Particularly, in recent demand for a lower profile, an illuminating apparatus of thin plate-like side light system has been used as an illuminating means.

Conventionally, a cold cathode fluorescent lamp or a hot cathode fluorescent lamp has been used as this illuminating apparatus. In either case, a fluorescent lamp needs a high voltage for discharging between electrodes and electric energy consumption has to be large. In particular for a portable type, the electric power generated from a battery is consumed mostly by this illuminating apparatus.

Therefore, an illuminating apparatus which uses a white emitting diode in place of fluorescent lamp has been developed and the patent application has been filed (see Patent application No. Hei 10-182076) by the inventors of the present invention. This system is explained based on FIG. 3 as an embodiment which is used for a reflection type of liquid crystal panel. A transparent substrate 1 is thin plate-like, along one side of which a bar-like light conductive member 2 is disposed. On one portion of the light conductive member 2, an optical path conversion means is provided as later described.

On at least one end of the light conductive member 2, a light emitting diode 3 (LED) as an emitting body is disposed. This light emitting diode 3 has a white luminescent color, and is adapted to be surrounded with a case having a light reflection function in such a manner as, when it is supplied with electric current and emits light, most of rays of light enter the light conductive member 2. Under this structure, when the light emitting diode 3 emits light, the ray of light proceeds toward the transparent substrate 1 through the light conductive member 2 and the emitted light illuminates a liquid crystal panel 4.

Thus, the light conductive member 2 has a function to convert the direction of the rays of light coming from the light emitting diode 3 at 90 degrees toward the transparent substrate 1, and in order to carry out its conversion well, a light reflection pattern with a plurality of grooves 2a shaped triangular in section and separated at a regular spacing with each other is formed on one of the surfaces. Now, a plane portion 2b is formed between the grooves 2a.

Under this structure, the light emitted from the LED 3 enters the inside of the light conductive member 2 at one end thereof, strikes the groove 2a as a light reflection pattern and proceeds from the light conductive member 2 toward the transparent substrate 1.

Further, between the transparent substrate 1 and the light conductive member 2, a light diffusion plate 5 is provided. when the rays of light emitted from LED 3 enters the light conductive member 2, only the groove 2a is brightened, rendering the groove 2a bright and the plane portion 2b dark, so that, when viewing the transparent substrate 1, a stripe pattern: of light and shade is seen. The diffusion plate 5 is provided to solve the above mentioned problem in such a manner as the rays of light are intermixed for a uniform brightness while travelling through the diffusion plate 5.

By the way, an emitting distribution of the emitted light of the spot-like light source like a light emitting diode has a characteristic with a specific emitting distribution as shown in FIG. 4 in which axis of ordinates represents a relative brightness indicating the intensity level. The emitting distribution from the light conductive member 2 when the light enters the light conductive member 2 as shown in FIG. 5, toward vertical direction, has a characteristic as shown in FIG. 6 which is not different from the one shown in FIG. 4 where the light does not go through the light conductive member 2. Toward the horizontal direction, the emitting distribution becomes as shown in FIG. 6 due to the groove 2a as a light reflection pattern shown in FIG. 5.

Further, by disposing the light diffusion plate 5 as shown in FIG. 7, the light emitting distribution spreads toward both vertical and horizontal directions as shown in FIG. 8. If it is disposed close to the transparent substrate 1 as shown in FIG. 9, the light emitting distribution toward the vertical direction is controlled as shown in FIG. 10 due to the light reflection pattern 1a formed on the transparent substrate 1, but no change is seen toward the horizontal direction.

Now, the above spread illuminating apparatus as an illuminating means for a liquid crystal display apparatus contains the following problem. That is, the light of large angle portion shown in FIG. 10 is located out of the field of view and is not usable. The present invention was made in the light of this point in a spread illuminating apparatus in which a bar-like light source is disposed close to the side of a transparent substrate made of a transparent material. The purpose is to make usable the unusable light located out of the field of view, in other words, to turn rays of light into the field of view in order to attain a brighter illumination.

According to a first aspect of the present invention, in a spread illuminating apparatus in which a bar-like light source formed with a light conductive member made of a transparent material and a spot-like light source provided at at least one end of the light conductive member is disposed close to a transparent substrate made of a transparent material, the light conductive member is provided with an optical path conversion means and an optical path conversion plate is disposed between the transparent substrate and the light conductive member.

According to a second aspect of the present invention, in a spread illuminating apparatus in the first aspect, the optical path conversion plate is provided with a row of prisms as an optical conversion means disposed on the other side of the optical path conversion plate than a side facing the transparent substrate.

According to a third aspect of the present invention, in a spread illuminating apparatus in the first or second aspect, a reflection plate of a white or metal vaporized film or the like is provided on the side of the light conductive member opposite to a side facing the optical path conversion means.

According to a fourth aspect of the present invention, in an illuminating apparatus in any one of the first to third aspects, the optical path conversion means of the light conductive member is formed with prism grooves in such a manner as hypotenuses of triangle are continuously disposed on one surface of the light conductive member.

According to a fifth aspect of the present invention, in a spread illuminating apparatus in any one of the first to third aspects, the optical path conversion means of the light conductive member is formed with the means of light dispersion consisting of minutely rugged surfaces.

According to a sixth aspect of the present invention, in a spread illuminating apparatus in any one of the first to third aspects, the optical path conversion means of the light conductive member is formed by applying an opaline coating containing light dispersive substances to one surface of the light conductive member.

By such constitution, the light which is emitted from the spot-like light source and enters the light conductive member exits slantingly due to the optical path conversion means.

This light, after entering the optical path conversion plate slantingly, enters the transparent substrate straightly due to the optical path conversion plate to improve the efficiency of the emitting distribution from the transparent substrate for illuminating the liquid crystal panel with a high brightness.

BRIEF DESCRIPTION OF THE DRAWINGS

FIG. 9 is a perspective view showing the diffusion plate provided close to the transparent substrate.

EMBODIMENT

Figure 1:
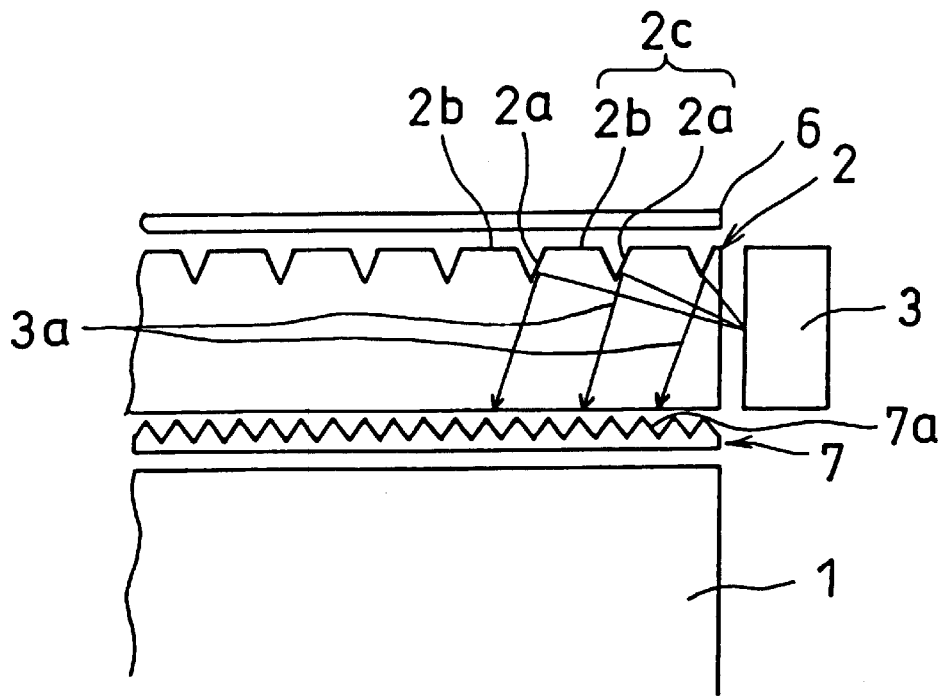
FIG. 1 is a plan view showing an essential part of one embodiment of the present invention.
Figure 2:
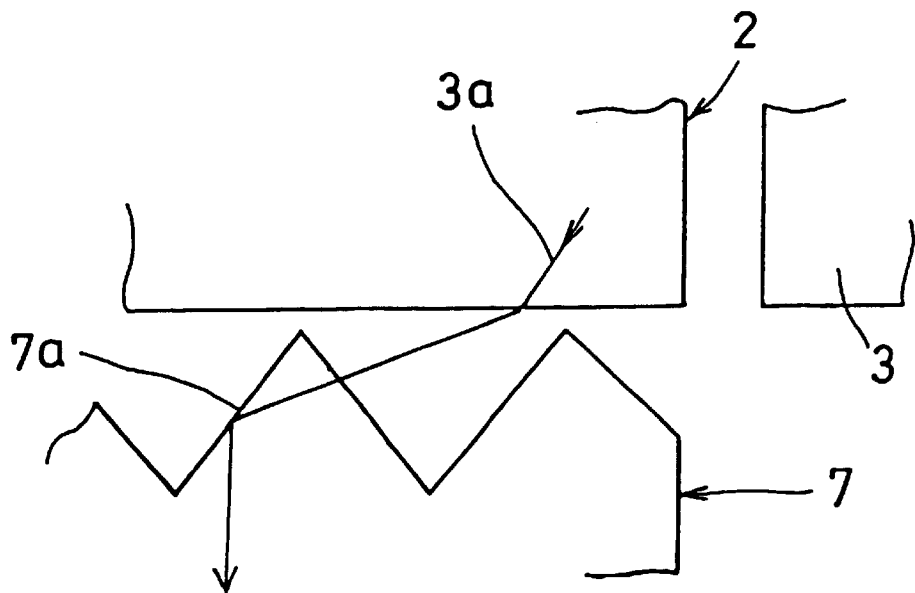
FIG. 2 is an enlarged view showing a portion of FIG. 1.

Hereinafter, an embodiment of the present invention is explained based on FIG. 1 showing a plan view of an essential part and FIG. 2 showing an enlarged view of a portion thereof. A transparent substrate 1 in rectangle having a large area is made of transparent materials, and close to one of sides thereof, a light conductive member 2 made also of transparent materials is disposed.

On one end (or both ends) of the light conductive member 2, a light emitting diode 3 as a spot-like light source is disposed and a bar-like light source is obtained by brightening the light conductive member 2.

On one side of the light conductive member 2, a prism groove 2c having inclined surfaces 2a and plane surfaces 2b as an optical path conversion means is formed consecutively. And, close to the side on which the prism grooves 2c are formed, a reflection plate 6 is provided, whereby the light turned aside from this part of the light conductive member 2 is reflected and adapted to be returned toward the light conductive member 2. Besides the above prism grooves 2c, the optical path conversion means can be constituted by further sectioning the prism grooves 2c to form a light dispersion means comprising minutely rugged surfaces, or by applying an opaline coating containing dispersive substances.

Figure 3:
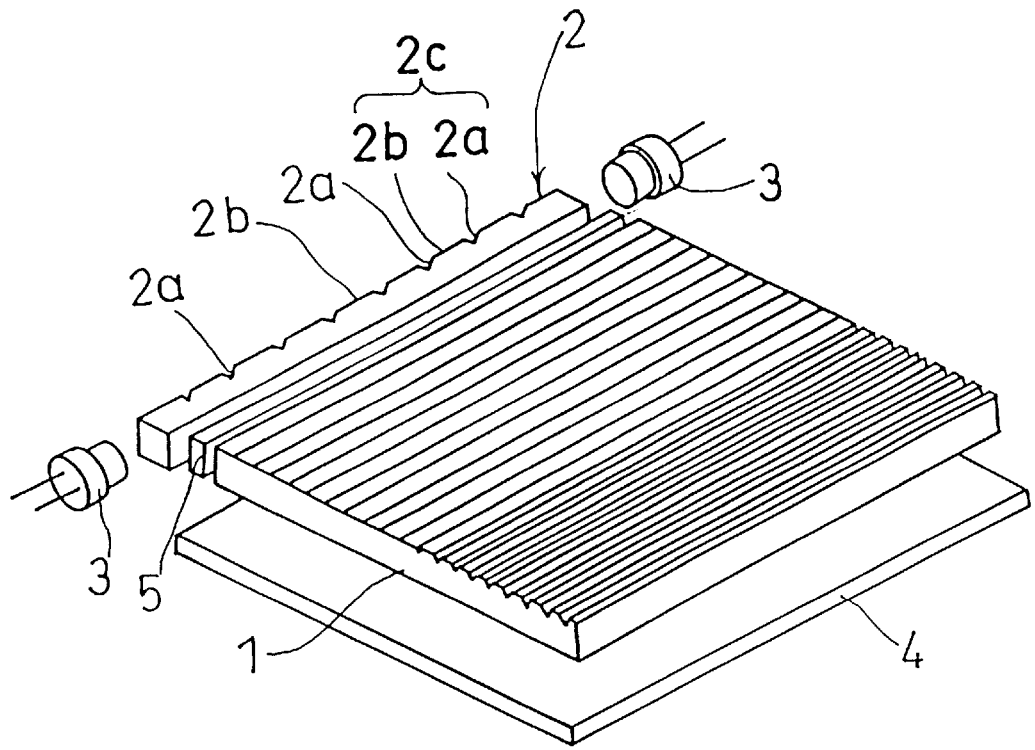
FIG. 3 is a perspective view showing the spread illuminating apparatus.
Figure 4:
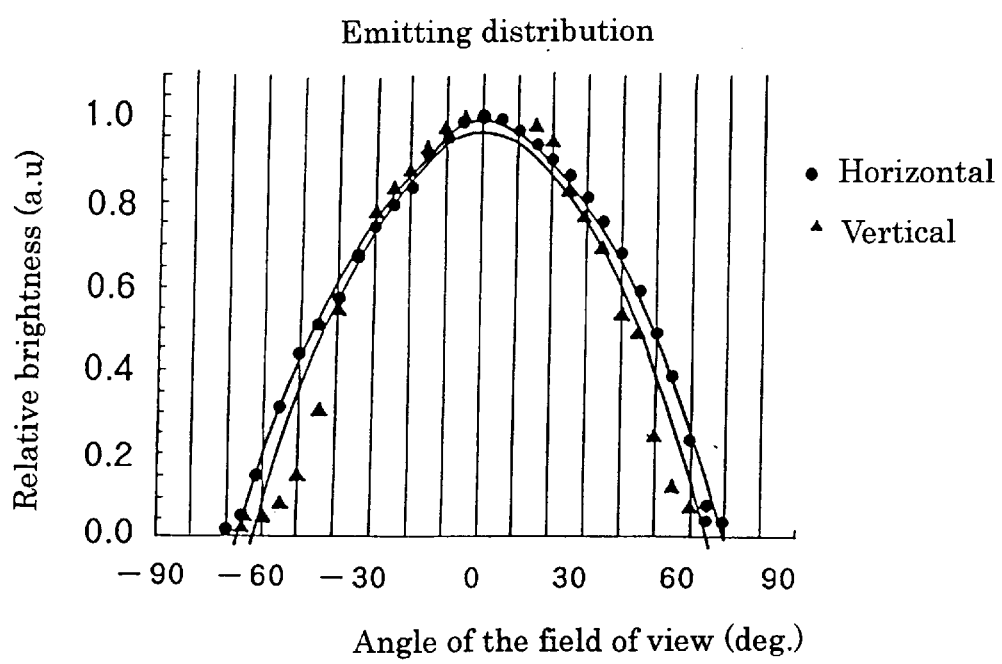
FIG. 4 is a graph indicating a relative luminous intensity in axis of ordinates and an angle of the field of view in an axis of abscissas.
Figure 5:
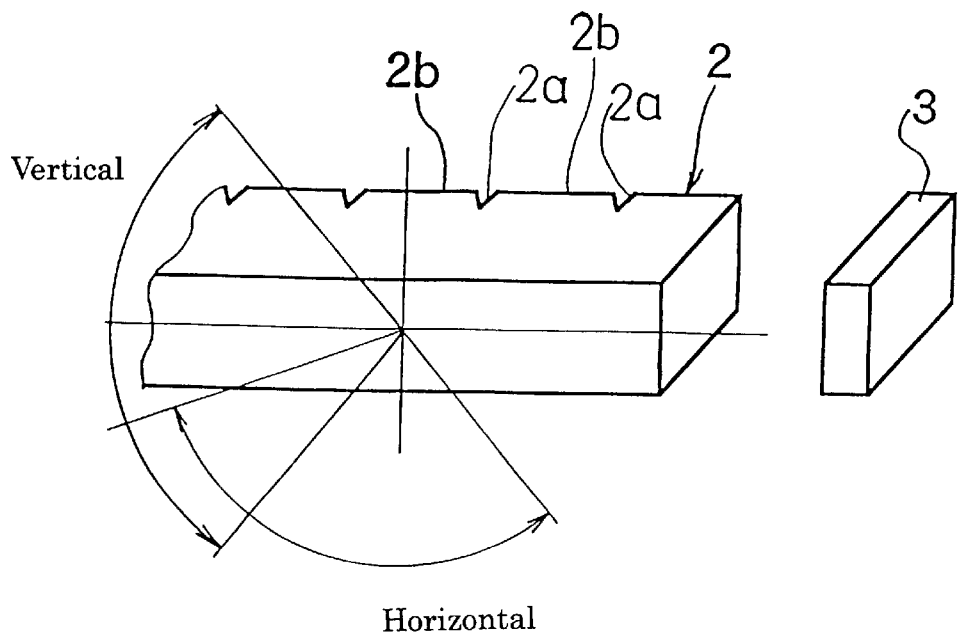
FIG. 5 is an explanation view showing the emitting distribution of the light conductive member.
Figure 6:
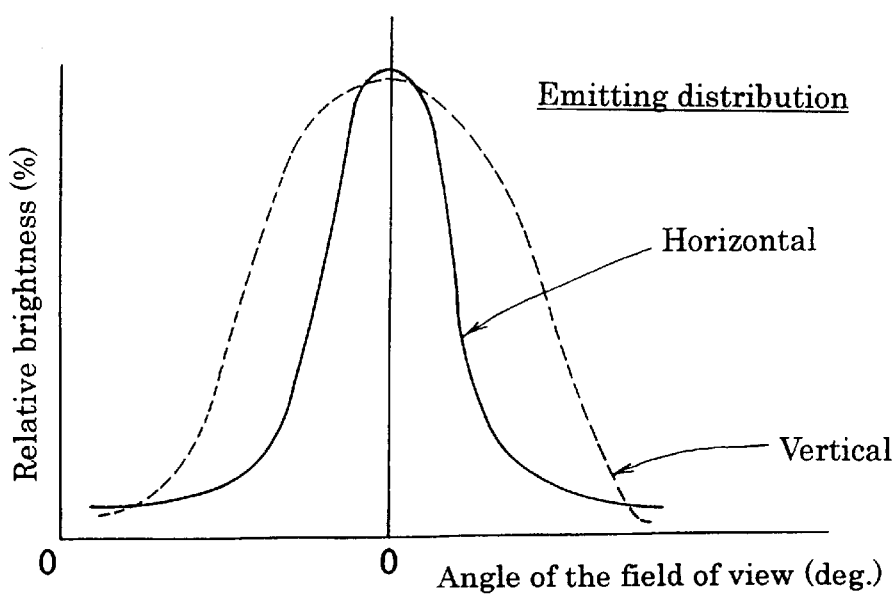
FIG. 6 is a graph indicating the light emitting distribution of FIG. 5.
Figure 7:
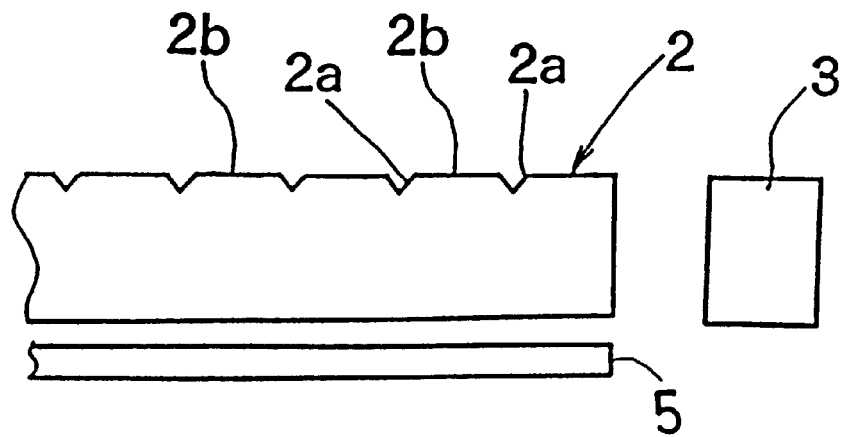
FIG. 7 is a plan view showing the light diffusion plate set in front of the light conductive member.
Figure 8:
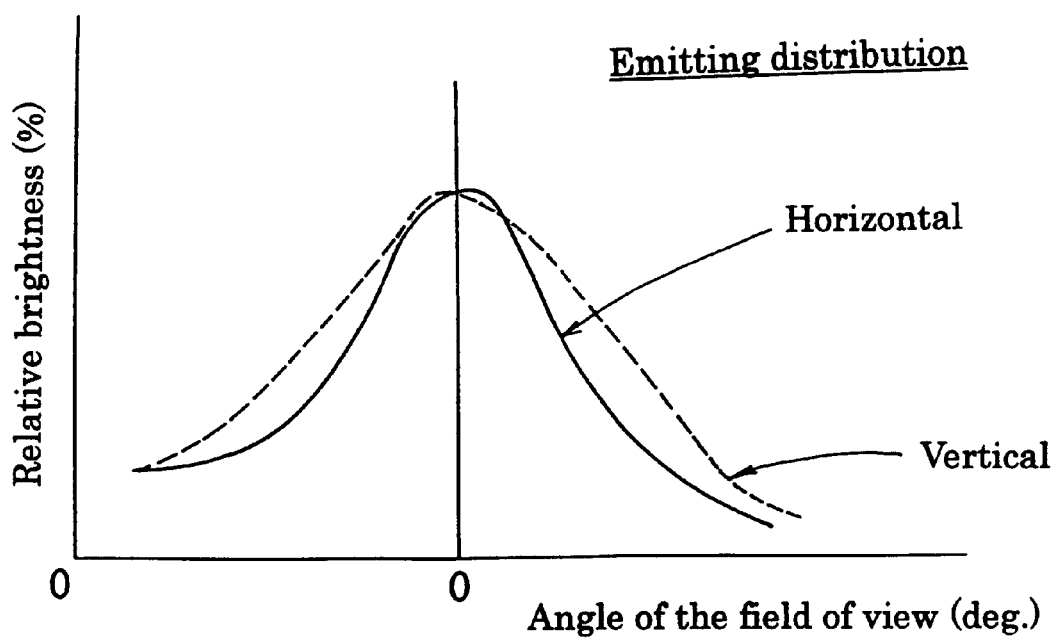
Figure 9:
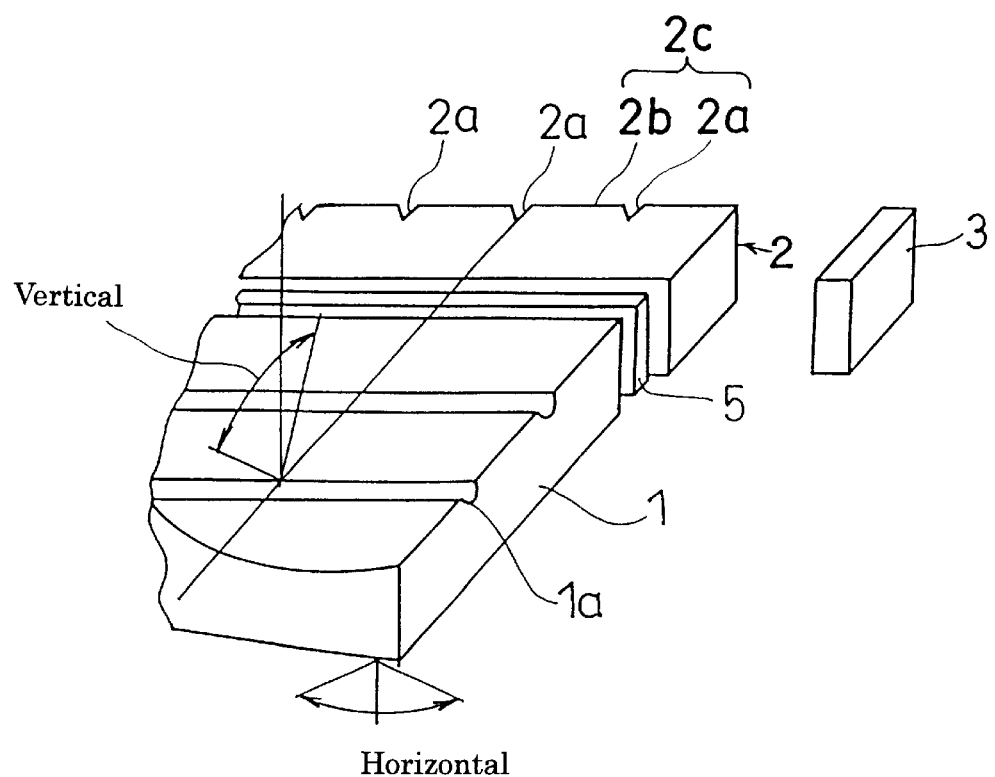
FIG. 9 is a graph showing the light emitting distribution by the structure of FIG. 7.
Figure 10:
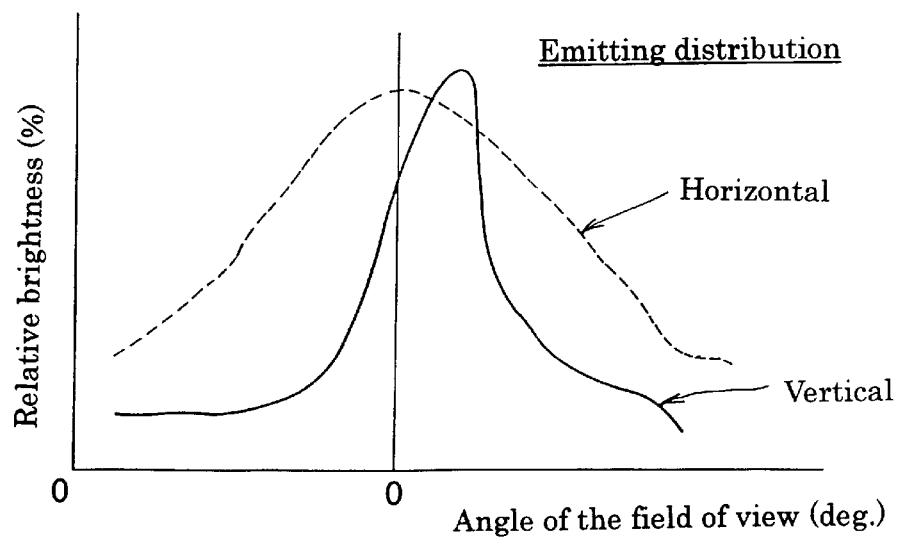
FIG. 10 is a graph indicating the light emitting distribution by the structure of FIG. 9.

FIGS. 3 and 9 show an embodiment where a diffusion plate 5 is provided between the transparent substrate 1 and the light conductive member 2, while an optical path conversion plate 7 is disposed in the present invention. In order to prevent the aforementioned stripe pattern of light and shade from being viewed, the prism grooves 2c of the light conductive member 2 are adapted to be fractionized minutely.

On this optical path conversion plate 7, a row of prisms 7a consisting of continuous triangular grooves are formed. The row of prisms 7a are disposed on the other side than a side facing the transparent substrate 1.

In the illuminating spread apparatus thus structured, when a light emitting diode 3 emits light, light 3a enters the light conductive member 2 at the end face thereof, strikes hypotenuses as the inclined surfaces 2a of the prism grooves 2c, progresses slantingly after reflection/refraction, then strikes the row of prisms 7a of the optical path conversion plate 7 and is refracted to enter straight the transparent substrate 1 (FIG. 1) as shown enlargedly in FIG. 2, which enables the transparent substrate 1 to be illuminated efficiently.

Since the spread illuminating apparatus of the present invention is structured as mentioned above, the light is directed slant toward the transparent substrate due to the optical path conversion means of the light conductive member, then is refracted by the optical path conversion plate and enters the transparent substrate straight. Therefore, the transparent substrate is illuminated effectively in a higher brightness and the indication of the liquid crystal panel becomes clearer.

What is claimed is:

1. A spread illuminating apparatus in which a bar-like light source comprising a light conductive member made of a transparent material and a spot-like light source disposed on at least one end of the light conductive member and emitting light directly to the light conductive member is disposed close to an end of a transparent substrate of a transparent material, wherein an optical path conversion means is provided on the light conductive member, an optical path conversion plate having a row of prisms as an optical conversion means on a surface thereof opposite to a surface facing the transparent substrate is provided between the light conductive member and the transparent substrate, and the light emitted from the spot-like light source enters the light conductive member, is reflected by the optical path conversion means in a slanted direction so as to go away from the spot-like light source, slantingly exits out the light conductive member, passes through the optical path conversion plate and is made incident on the transparent substrate.

2. A spread illuminating apparatus according to claim 1, wherein a reflection plate is disposed opposite to the optical path conversion means of the light conductive member.

3. A spread illuminating apparatus according to claim 2, wherein the reflection plate is made of a white film or a metal-vaporized film.

4. A spread illuminating apparatus according to claim 1, wherein the optical path conversion means of the light conductive member is formed by providing a row of prism grooves comprising inclined surfaces of triangle continuously on one surface thereof.

5. A spread illuminating apparatus according to claim 1, wherein the optical path conversion means of the light conductive member is formed with a light dispersion or means comprising minute ruggedness on one surface thereof.

6. A spread illuminating apparatus according to claim 1, wherein the optical path conversion means of the light conductive member is formed by applying opaline paints containing light dispersive materials on one surface thereof.

7. A spread illuminating apparatus according to claim 2, wherein the optical path conversion means of the light conductive member is formed by providing a row of prism grooves comprising inclined surfaces of triangle continuously on one surface thereof.

8. A spread illuminating apparatus according to claim 2, wherein the optical path conversion means of the light conductive member is formed with a light dispersion means comprising minute ruggedness on one surface thereof.

9. A spread illuminating apparatus according to claim 2, wherein the optical path conversion means of the light conductive member is formed by applying opaline paints containing light dispersive materials on one surface thereof.

* * * * *

UNITED STATES PATENT AND TRADEMARK OFFICE
CERTIFICATE OF CORRECTION

PATENT NO.    : 6,494,588 B1                                             Page 1 of 1
DATED         : December 17, 2002
INVENTOR(S)   : Masafumi Okada It is certified that error appears in the above-identified patent and that said Letters Patent is hereby corrected as shown below:

<u>Title page,</u>
Insert
-- Foreign Application Priority Data
[30]    Jul. 26, 1998 (JP).....................11-210584 --

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,494,588 B1
DATED : December 17, 2002
INVENTOR(S) : Masafumi Okada It is certified that error appears in the above-identified patent and that said Letters Patent is hereby corrected as shown below:

<u>Title page,</u>
Insert:

--      Foreign Application Priority Data

[30]     Jul. 26, 1999    (JP)……………………..11-210584 --

This certificate supersedes Certificate of Correction issued April 29, 2003.

Signed and Sealed this

Twenty-fourth Day of June, 2003

JAMES E. ROGAN
*Director of the United States Patent and Trademark Office*